United States Patent
Sugaya

(10) Patent No.: US 8,601,317 B2
(45) Date of Patent: Dec. 3, 2013

(54) TERMINAL RECOVERY METHOD, TERMINAL RECOVERY SYSTEM, AND PROGRAM FOR THE SAME

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 205 days.

(21) Appl. No.: 13/276,865

(22) Filed: Oct. 19, 2011

(65) Prior Publication Data

US 2013/0091381 A1    Apr. 11, 2013

(30) Foreign Application Priority Data

Oct. 7, 2011 (JP) .................................. 2011-222569

(51) Int. Cl.
  *G06F 11/00* (2006.01)
(52) U.S. Cl.
  USPC ............................................. 714/15; 714/32
(58) Field of Classification Search
  USPC .......................................................... 714/15
  See application file for complete search history.

(56) References Cited

U.S. PATENT DOCUMENTS

| | | | |
|---|---|---|---|
| 7,882,205 B2 * | 2/2011 | Sugaya | 709/220 |
| 2009/0164849 A1 * | 6/2009 | Sugaya | 714/38 |
| 2012/0154108 A1 * | 6/2012 | Sugaya | 340/5.1 |
| 2012/0233244 A1 * | 9/2012 | Sugaya | 709/203 |
| 2012/0239783 A1 * | 9/2012 | Sugaya | 709/219 |
| 2012/0303741 A1 * | 11/2012 | Sugaya | 709/217 |
| 2013/0013594 A1 * | 1/2013 | Sugaya | 707/723 |
| 2013/0080833 A1 * | 3/2013 | Sugaya | 714/32 |
| 2013/0086421 A1 * | 4/2013 | Sugaya | 714/32 |

FOREIGN PATENT DOCUMENTS

| | | | |
|---|---|---|---|
| JP | 2003006062 A | 1/2003 |
| JP | 2009015451 A | 1/2009 |
| JP | 2011034315 A | 2/2011 |

* cited by examiner

*Primary Examiner* — Kamini Patel
(74) *Attorney, Agent, or Firm* — BainwoodHuang

(57) ABSTRACT

The operator terminal receives input of the terminal status of the recovery target terminal 10 from an operator, extracts a recovery item for recovering the terminal status of the recovery target terminal 10 and a recovery set value being a value recovered corresponding to the recovery item based on the input terminal status, and generates a recovery code at least including the recovery item and the recovery set value. The recovery target terminal 10 decodes the recovery code in response to input of the recovery code to acquire the recovery item and the recovery set value and executes a recovery process for the terminal status based on the acquired recovery item and the acquired recovery set value.

6 Claims, 6 Drawing Sheets

Fig.5 <RECOVERY ITEM CORRESPONDENCE TABLE>

| STATUS NUMBER | TERMINAL STATUS | RECOMMENDED COUNTERMEASURE | RECOVERY ITEM | RECOVERY SET VALUE |
|---|---|---|---|---|
| 1 | Communication is disabled. | Turn OFF flight mode | FLIGHT MODE SETTING | OFF |
| 2 | Power saving mode cannot be turned off. | Turn OFF power saving mode | POWER SAVING MODE SETTING | OFF |
| 3 | Communication through Wi-Fi is disabled. | Turn ON Wi-Fi setting | Wi-Fi SETTING | ON |
| 4 | SSID has not been set. | Connect to network with the following SSID | SSID SETTING | INPUT RECEIVING |
| : | : | : | : | : |

Fig.6 <RECOVERY CODE CORRESPONDENCE TABLE>

| RECOVERY ITEM | ORDER |
|---|---|
| FLIGHT MODE SETTING | 1 |
| Wi-Fi SETTING | 2 |
| SSID SETTING | 3 |
| POWER SAVING MODE SETTING | 4 |

Fig.7 <RECOVERY RESULT CORRESPONDENCE TABLE>

| RECOVERY ITEM | CODE SET VALUE |
|---|---|
| Wi-Fi SETTING | ON:1/OFF:0 |
| SSID SETTING | ON:1/OFF:0 |
| FLIGHT MODE SETTING | ON:1/OFF:0 |
| POWER SAVING MODE SETTING | ON:1/OFF:0 |
| : | : |

Fig.8

RECOVERY CODE (8 BITS = 4 RECOVERY ITEMS)

NOT SELECTED   SELECTED   ON   SELECTED   ON   NOT SELECTED 0   0   1   1   1   1   0   0

FLIGHT MODE SETTING    SSID SETTING
        Wi-Fi SETTING           POWER SAVING MODE SETTING

Fig.9 <RECOVERY PROCESS CORRESPONDENCE TABLE>

| RECOVERY ITEM | RECOVERY MODULE | CHECK MODULE | RECOVERY RESULT |
|---|---|---|---|
| Wi-Fi SETTING | MODULE A | CHECK MODULE A | Wi-Fi SET VALUE = 1 |
| SSID SETTING | MODULE B | CHECK MODULE B | SSID SET VALUE = 1 |
| FLIGHT MODE SETTING | MODULE C | CHECK MODULE C | FLIGHT MODE VALUE = 1 |
| POWER SAVING MODE SETTING | MODULE D | CHECK MODULE D | POWER SAVING MODE VALUE = 1 |
| : | : | | |

<RECOVERY CODE INPUT SCREEN>

<RECOVERY COMPLETION OUTPUT SCREEN>

<TERMINAL MODEL CLASSIFIED RECOVERY ITEM CORRESPONDENCE TABLE>

| TERMINAL STATUS | TERMINAL MODEL | RECOMMENDED COUNTERMEASURE | RECOVERY ITEM | RECOVERY SET VALUE |
|---|---|---|---|---|
| Communication through Wi-Fi is disabled. | TERMINAL A | Turn ON Wi-Fi setting | Wi-Fi SETTING | ON |
| | TERMINAL B | Turn ON network setting | NETWORK SETTING | ON |
| | TERMINAL C | Decrease security level | INTERNET SECURITY | MIDDLE |
| ... | ... | ... | ... | ... |

Fig. 13

TERMINAL RECOVERY METHOD, TERMINAL RECOVERY SYSTEM, AND PROGRAM FOR THE SAME

This application is based on and claims the benefit of priority from Japanese Patent Application No. 2011-222569, filed on 7 Oct. 2011, the content and teachings of which are incorporated herein by reference.

TECHNICAL FIELD

The present invention relates to a terminal recovery method, a terminal recovery system, and a program for the same that use a recovery code for remotely recovering smart phones, personal computers, and the like.

BACKGROUND ART

In recent years, various services have been provided for users by connecting portable terminals with a web server and the like through a public line network. In particular, advanced services, which have been provided for personal computers conventionally, has become possible to provide for mobile phones by the appearance of smart phones (highly functional mobile phones).

In order to maximize the use of such advanced web services and the high functionality of smart phones, users need to know the operation of configuration and the function of a smart phone. In addition, if users who are not used to operation configuring their own terminals for the first time, the settings that should not be deleted may be actually deleted, or inappropriate configuration may be conducted to cause an error.

For approaching such problems, there has been a known method of remotely supporting (remote maintain) a user's terminal from a system so as to remotely configure the user's terminal and so as to remotely login the user's terminal to change the settings and to guide the setting operation. For example, PLT 1 discloses that a server acquires the screen information of each client to be supported and constantly displays a list of this screen information so as to improve the performance of support and monitoring for a user.

In addition, PLT 2 discloses the technology capable of remote support by transferring the screen information of a user terminal through the use of augmented reality achieved by means of the camera of a mobile phone.

CITATION LIST

Patent Literature

PLT 1: Japanese Unexamined Patent Application 2003-6062
PLT 2: Japanese Unexamined Patent Application 2011-34315
PLT 3: Japanese Unexamined Patent Application 2009-15451

SUMMARY OF INVENTION

However, in the case of remote support by transferring user's screen information in this way, transferring user's private information as screen information may allow the operator side to view this private information. Specifically, an operator may know user's data such as user's ID, password, interest, and the like.

In addition, when allowed to login from an operator terminal to a user terminal through remote login or the like and operate the user terminal, an operator can freely manipulate data in the user terminal. As a result, a user may not notice if an operator views and replicates the data. Such a user's anxiety may prevent an explosive boom of the remote support system.

Furthermore, in transferring user's screen information and remote support conducting remote login, users cannot receive support while offline. A user wishes to receive remote support required for communication, but diagnosis for recovering from the failure may not be able to be started during communication failure.

Then, some of the present improvements focus attention on high needs of the system allowing an operator to recover a user terminal without transferring screen information of the user terminal while the user is offline.

Conventionally, PLT 3 discloses a method of changing the setting by representing a recovery code using numerical values and character strings for changing settings, and inputting the recovery code to a user terminal. According to this technology, only inputting a recovery code makes it possible to change the setting even if a user cannot directly change the settings.

However, in the method of PLT 3, it is impossible to generate a recovery code unless an operator understands all of the recovery item, the recovery procedure, and the set value to be changed. In the present circumstances, the recovery item, the recovery procedure, and the set value to be changed often vary with the kind of a target user terminal to be recovered.

For example, in the setting of enabling the wireless LAN, the setting cannot be made for enabling the wireless LAN unless the setting item "Wi-Fi setting" is set to "ON" in the terminal A. In contrast, the terminal B does not have the setting item "Wi-Fi setting," and therefore the setting cannot be made for enabling the wireless LAN unless "Network setting" is set to "ON." The operator cannot complete recovery without understanding an item (recovery item) for changing such a setting or a set value to be changed.

As just described, in the situation in which the recovery item, the recovery procedure, and the set value to be changed vary with the kind of a user terminal to be recovered, an operator more hardly understand the setting item and the set values to be changed in detail as the model of the user terminal increases. In this case, it makes it impossible to generate a recovery code, and therefore support is not provided. Therefore, the present inventor has focused attention on desirability of the method of generating a recovery code to support allow an operator to generate a recovery code.

An object of the present invention is to provide a terminal recovery method, a terminal recovery system, and a program for the same capable of recovery even if the user is offline and of supporting an operator to conduct recovery, in which no private information of the user terminal is leaked unlike screen transfer, in order to recover a user terminal.

According to a first aspect of the present invention, a terminal recovery method of recovering a terminal status by changing a set value of a recovery target terminal, includes the steps of:

receiving input of the terminal status of the recovery target terminal from an operator by an operator terminal;

extracting a recovery item for recovering the terminal status of the recovery target terminal and a recovery set value being a value recovered corresponding to the recovery item by an operator terminal based on the input terminal status;

generating a recovery code at least including the recovery item and the recovery set value by an operator terminal;

decoding the recovery code in response to input of the recovery code to acquire the recovery item and the recovery set value by the recovery target terminal; and executing a recovery process to recover the terminal status based on the acquired recovery item and the acquired recovery set value by the recovery target terminal.

According to the first aspect of the present invention, the operator terminal receives input of the terminal status of the recovery target terminal from an operator, extracts a recovery item for recovering the terminal status of the recovery target terminal and a recovery set value being a value recovered corresponding to the recovery item based on the input terminal status, and generates a recovery code at least including the recovery item and the recovery set value. The recovery target terminal decodes the recovery code in response to input of the recovery code to acquire the recovery item and the recovery set value and executes a recovery process to recover the terminal status based on the acquired recovery item and the acquired recovery set value.

Therefore, a terminal recovery method capable of recovery even if the user is offline and of supporting an operator to generate a recovery code by extracting a recovery item and a recovery set value by inputting the terminal status can be provided, in which no private information of the user terminal is leaked unlike screen transfer, in order to recover a user terminal.

In categories of the invention, a terminal recovery system and a program for the same have functions and effects similar to those of the terminal recovery method according to the first aspect of the present invention.

According to a second aspect of the present invention, the terminal recovery method according to the first aspect of the present invention further includes the step of acquiring a backup of a corresponding recovery item and a recovery set value corresponding to the recovery item at the time before or after the recovery code is input, by the recovery target terminal.

In categories of the invention, a terminal recovery system and a program for the same have functions and effects similar to those of the terminal recovery method according to the second aspect of the present invention.

According to a third aspect of the present invention, the terminal recovery method according to the first aspect of the present invention further includes the step of examining the recovery result of the recovery process.

In categories of the invention, a terminal recovery system and a program for the same have functions and effects similar to those of the terminal recovery method according to the third aspect of the present invention.

According to a fourth aspect of the present invention, in the terminal recovery method according to the first aspect of the present invention, when the purpose to recover the terminal status is the same, but the recovery item that is a concrete means to recover the terminal status is different due to a different model of the recovery target terminal, in the step of extracting the recovery item, a corresponding recovery item and a recovery set value corresponding to the recovery item is extracted by receiving input of a model name corresponding to the model.

In categories of the invention, a terminal recovery system and a program for the same have functions and effects similar to those of the terminal recovery method according to the fourth aspect of the present invention.

According to the present invention, a terminal recovery method, a terminal recovery system, and a program for the same capable of recovery even if the user is offline and of support for an operator can be provided, in which no private information of the user terminal is leaked unlike screen transfer, in order to recover a user terminal.

BRIEF DESCRIPTION OF DRAWINGS

FIG. 5 shows the recovery item correspondence table stored in an operator terminal 150;

FIG. 6 shows the recovery code correspondence table stored in a recovery target terminal and an operator terminal 150;

FIG. 7 shows the recovery result correspondence table stored in a recovery target terminal and an operator terminal 150;

FIG. 8 shows an example of generating a recovery code;

FIG. 9 shows the recovery process correspondence table stored in a recovery target terminal;

FIG. 13 shows the terminal model classified recovery item correspondence table stored in an operator terminal 150.

DESCRIPTION OF EMBODIMENTS

Hereinafter, a best mode of the present invention will be described with reference to the attached drawings. However, this is illustrative only, and the technological scope of the present invention is not limited thereto.

Configuration of Recovery Code Generation System

Figure 1:
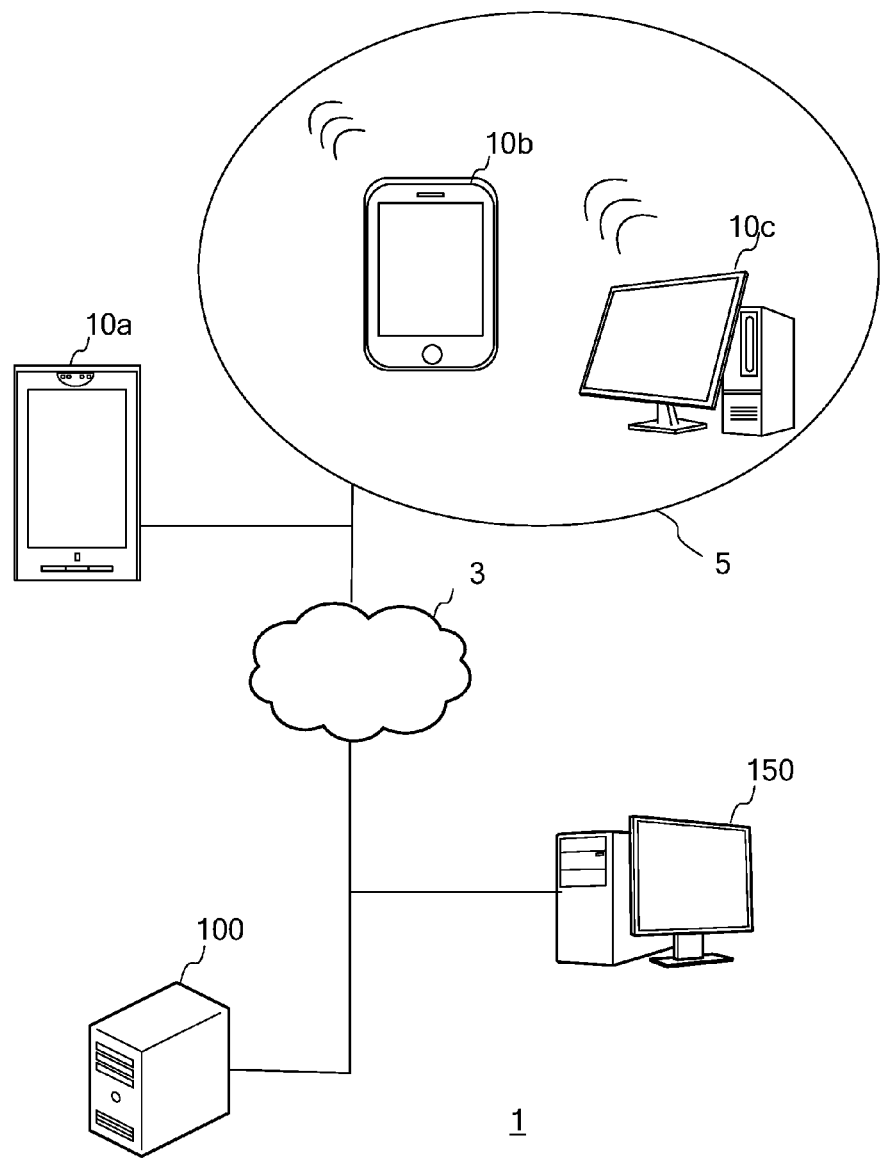
FIG. 1 shows the overall schematic diagram of a recovery code generation system 1.

FIG. 1 is the system configuration diagram of a recovery code generation system 1 that is a preferred embodiment of the present invention. The recovery code generation system 1 includes recovery target terminals 10a, 10b, and 10c (hereinafter simply referred to as "recovery target terminal 10"), a public line network 3 (e.g., an Internet network, a third generation communication network, a fourth generation communication network, etc.), and an operator terminal 150 (remote terminal). The operator server 100 is not an indispensable component as described hereinafter.

The recovery target terminal 10 and the operator terminal 150 or the operator server 100 each may be connected with a public line network 3. Enabling data communication between the recovery target terminal 10 and the operator terminal 150 or the operator server 100 is not a requisite element of the present embodiment.

Like the recovery target terminals 10b and 10c, the recovery target terminal 10 may be connected with a public line network 3 through a local area network 5. Alternatively, like the recovery target terminal 10a, the recovery target terminal 10 may communicate with a base station through radio waves so as to connect with a public line network 3 through the base station connected with an exchanger, without a local area network 5.

The recovery target terminal 10 may be a general information terminal used by users, which is an information technology device or an electrical appliance, which is provided with the below-mentioned functions including a verbal communication function. The recovery target terminal 10 may be, for example, a smart phone 10a, a slate terminal 10b, a personal computer 10c, and a mobile phone, or may be general information appliances such as a home phone, a net book terminal, an electronic book terminal, and an electronic dictionary terminal, and household appliances such as a television, a printer, a refrigerator, and a telephone set.

The operator terminal 150 is an information terminal such as a general personal computer used by an operator who provides support for a recovery target terminal 10.

Functions

Figure 2:
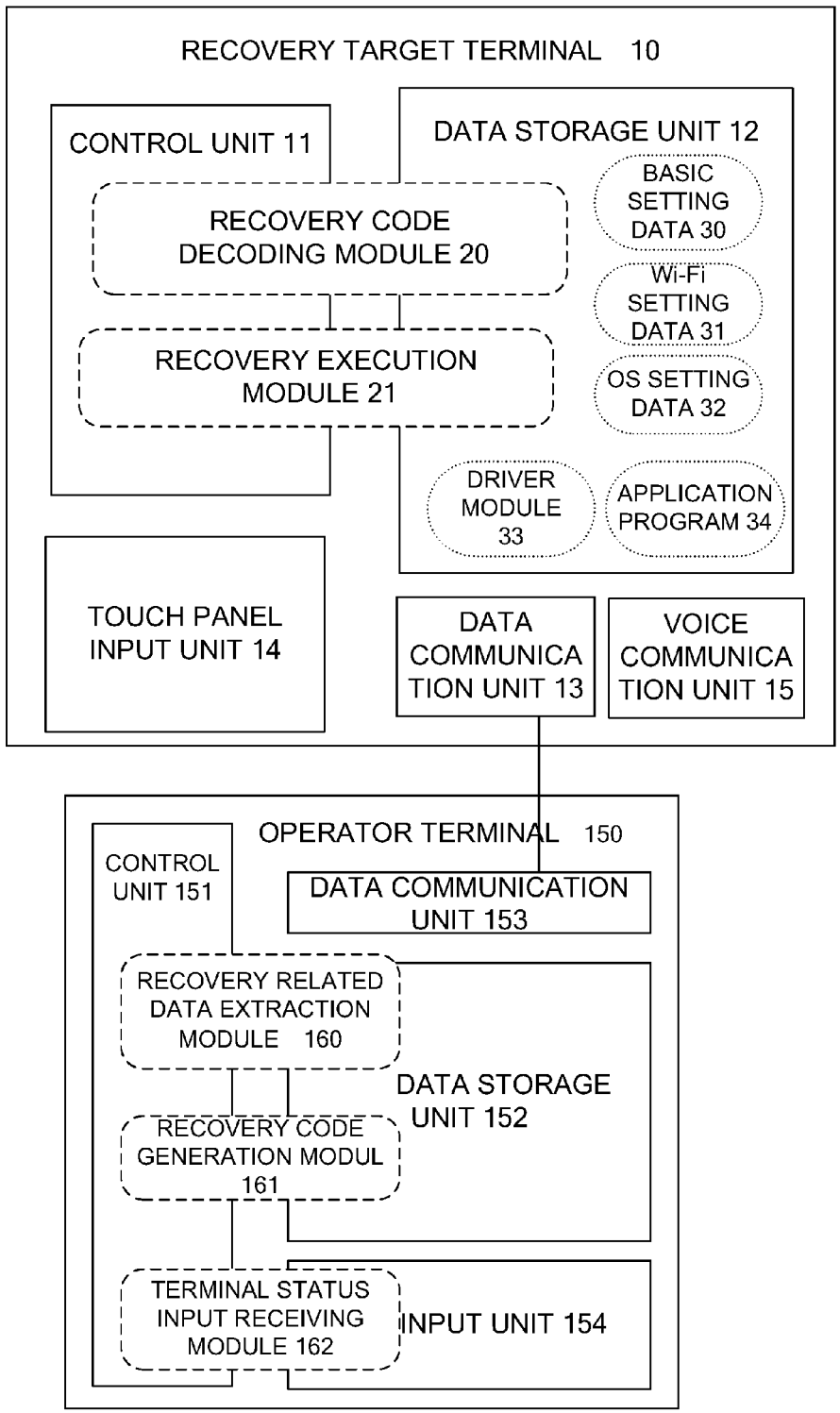
FIG. 2 shows the functional block diagram of a recovery target terminal 10 and an operator terminal 150.

FIG. 2 shows the functional block diagram of a recovery target terminal 10 and an operator terminal 150. The function and the hardware setting of each device will be explained with reference to FIG. 2.

The recovery target terminal 10 is a terminal to be recovered, which is used by general users. If only provided with a control unit 11, a data storage unit 12, a data communication unit 13, a touch panel input unit 14, and a voice communication unit 15, the recovery target terminal 10 may be any of a home electrical appliance, a business electrical appliance, a portable terminal, and a business terminal.

The recovery in the present embodiment may be a process to change the setting of the recovery target terminal 10 or may be replacement or update of the program and the module of hardware or software by downloading a new program and module.

The control unit 11 include a central processing unit (hereinafter referred to as "CPU"), a random access memory (hereinafter referred to as "RAM"), and a read only memory (hereinafter referred to as "ROM"), and the like; and the data communication unit 13 includes a Wireless Fidelity® or WiFi® enabled device complying with, for example, IEEE802.11; or a wireless device complying with the IMT-2000 standard such as the third generation mobile communication system, or the like. The communication unit 13 may include a wired device for LAN connection.

The data storage unit 12 includes any or all of an HDD (Hard Disk Drive), an SSD (Solid State Drive), a memory, and the like. In addition, the touch panel input unit 14 includes a display unit such as a liquid crystal monitor displaying images and text messages; and an input unit such as a touch panel receiving input from a user. The touch panel input unit 14 may be provided with a voice input unit.

In the data storage unit 12, the recovery result correspondence table, the recovery code correspondence table, and the recovery process correspondence table as described hereinafter are stored.

The data storage unit 12 stores data and program to be recovered. The data to be recovered is, for example, basic setting data 30 describing data on the basic setting of the recovery target terminal 10, Wi-Fi setting data 31 describing data on the settings of Wi-Fi, OS setting data 32 describing data on the setting of the operating system, a driver module 33 that is a hardware driver operable in the recovery target terminal 10, and an application program 34 that is a program for an application operable in the recovery target terminal 10.

The voice communication unit 15 is a device provided with an audio data receiving and output function receiving utterances with the other side (an operator) communicating with a user as digital signals to be heard by the user; and an audio data transmission function inputting user's utterances as digital signals and transmitting the user's utterances to a phone and the like of the other side as audio data.

The recovery target terminal 10 achieves a recovery code decoding module 20 and a recovery execution module 21 by the control unit 11 reading out a predetermined program from the data storage unit 12.

The operator terminal 150 is a terminal used by an operator who supports users. The operator terminal 150 may be a computer such as a general personal computer. The hardware setting of the operator terminal 150 may be the same as that of the recovery target terminal 10, and therefore the explanation is omitted. Unlike the recovery target terminal 10, an input unit 154 of the operator terminal 150 may be a general keyboard and a general monitor, without limiting to a touch panel.

In the data storage unit 152, the recovery item correspondence table, the recovery result correspondence table, and the recovery code correspondence table, as described hereinafter are stored.

The operator terminal 150 achieves a recovery related data extraction module 160 and a recovery code generation module 161 by a control unit 151 cooperating with the data storage unit 152. The operator terminal 150 achieves a terminal status input receiving module 162 by a control unit 151 cooperating with the input unit 154.

The operator server 100 is not an indispensable component of the present invention but may be a server relaying communication between the recovery target terminal 10 and the operator terminal 150. Similarly, the operator server 100 may also be provided with a control unit, a data storage unit, and a data communication unit to achieve the recovery related data extraction module 160 and the recovery code generation module 161 by the control unit cooperating with the data storage unit.

If only achieved by the operator server 100, the recovery related data extraction module 160 and the recovery code generation module 161 may not be provided in the operator terminal 150, and the present embodiment is thus achieved through so-called software as a service (hereinafter referred to as "SaaS"). In this case, the operator terminal 150 functions as an input/output terminal.

In other words, based on a terminal status determined by the operator terminal 150, the recovery related data extraction module 160 operable in the operator server 100 extracts a recovery item for recovering the terminal status of the recovery target terminal 10 and a recovery set value that is a value to be recovered corresponding to the recovery item, and the recovery code generation module 161 generates a corresponding recovery code. The generated recovery code is transmitted and output to the operator terminal 150.

Recovery Code Generation Process

The recovery code generation process executed by the operator terminal 150 will be explained based on FIG. 3. At the start, the terminal status input receiving module 162 of the operator terminal 150 outputs the terminal status (Step S01). The terminal status is the status of a terminal that is desired to be solved by a user for the recovery target terminal 10. An operator receives an inquiry about a problem from a user through phone or the like. The problem is selected from this inquiry as a terminal status. Specifically, many kinds of problems are output and listed on the operator terminal 150, and an operator checks a checkbox or the like for the problem, thereby reflecting the terminal status. This problem may be in plural.

Figure 10:
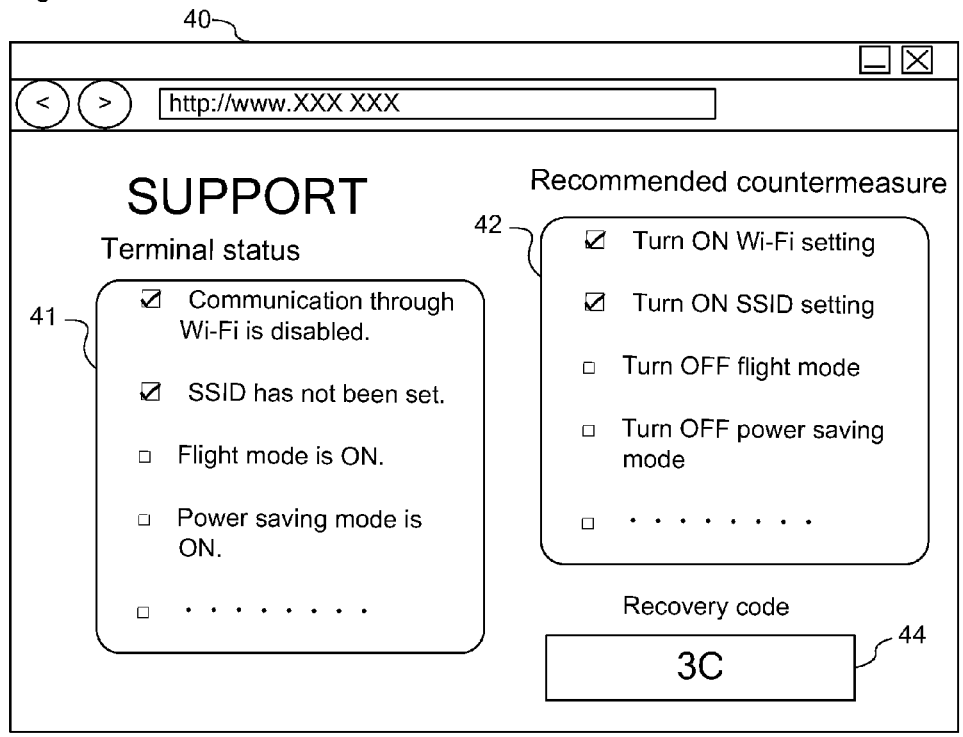
FIG. 10 shows the output screen image of a terminal setting and a recommended countermeasure output to an operator terminal 150.

FIG. 10 is the screen image illustrating an example in which a terminal status is output to an operator terminal 150. The terminal status 41 is composed of "Communication through Wi-Fi is disabled.," "SSID has not been set.," "Flight mode is ON.," and the like. In the example of FIG. 10, an operator checks the checkboxes to select "Communication through Wi-Fi is disabled." and "SSID has not been set." as terminal statuses. SSID is the identifier of an access point in a wireless LAN and the abbreviation of "Service Set Identifier."

Accordingly, an operator selects an appropriate terminal status for the output terminal statuses and, for example, presses a terminal status determination button (not shown), thereby determining the terminal status of the recovery target terminal 10 that the operator has analyzed (Step S02). After the determination, the process is moved to the step S03 (Step S02: "YES"). Otherwise, the process waits for input of the terminal status from an operator until this determination is made (Step S02: "NO").

Then, the recovery related data extraction module 160 of the operator terminal 10 outputs a recommended countermeasure according to the selected terminal status (Step S03). The recommended countermeasure is a message shown in the recovery item correspondence table. A recommended countermeasure corresponding to the selected terminal status is selected and output as shown in FIG. 10.

For example, the recommended countermeasures for "Communication through Wi-Fi is disabled." and "SSID has not been set." are "Turn ON Wi-Fi setting," and "Turn ON SSID setting," respectively. The checkboxes for these recovery processes are checked so that the processes are executed in the recovery target terminal 10. This checking may be configured so that an operator can clear checkboxes, or so that other countermeasures can be selected.

An operator presses the recommended countermeasure determination button (not shown) after selecting a recommended countermeasure, thereby moving the process to the step S04. Then, the recovery related data extraction module 160 refers to the recovery item correspondence table to extract a recovery item (Step S04). The recovery item is an item to change a set value, which is set in the recovery target terminal 10. In the example of the terminal status "Communication through Wi-Fi is disabled.," the recovery item corresponds to "Wi-Fi setting."

Then, the recovery related data extraction module 160 refers to the recovery item correspondence table to extract a recovery set value (Step S05). The recovery set value is a value set for a recovery item. In the example of the terminal status "Communication through Wi-Fi is disabled.," the recovery item is "Wi-Fi setting," and the recovery set value corresponds to "ON."

A recovery set value may be extracted by input from an operator. Specifically, input of an SSID and an IP address is received, and this input value may be defined as the set value.

Then, the recovery code generation module 161 of the operator terminal 10 generates a recovery code (Step S06). As one example show in FIG. 8, a recovery code is composed of eight bits of the binary numbers, including four recovery items. The four recovery items are "Flight mode setting," "Wi-Fi setting," "SSID setting," and "Power saving mode setting" as shown in the recovery code correspondence table of FIG. 6. FIG. 8 shows the mapping of recovery items on a recovery code. According to the recovery code correspondence table, "Flight mode setting," "Wi-Fi setting," "SSID setting," and "Power saving mode setting" are ordered, so that a recovery code is generated in this order.

The recovery code is composed with respect to every two digits. The previous value represents whether or not the recovery item has been selected by an operator. If the recovery item is not selected, the value is set to "0." If it is not, the value is set to "1." In the above-mentioned example, the recovery items that have been selected by an operator are "Wi-Fi setting" and "SSID setting," and the corresponding bits are therefore set to "1." On the other hand, the recovery items that have not been selected are "Flight mode setting" and "Power saving mode setting," and the corresponding bits are therefore set to "0."

The next value shows a code set value. The recovery code generation module 161 refers to the recovery result correspondence table of FIG. 7 to determine a code set value, based on the extracted recovery set value with respect to each recovery item of the selected recovery item. For example, the determined recovery set value is "ON" for the recovery item "Wi-Fi setting," and the code set value is therefore "1" according to the recovery result correspondence table. Thus, the next value of "Wi-Fi setting" of the recovery code is set to "1."

The setting item "SSID setting" is processed in the same way. As a result, the recovery code in this case will be "00111100" as shown in FIG. 8, or "3C" in hexadecimal. Then, the recovery code generation module 161 outputs the recovery code 44 as shown in FIG. 10.

The recovery set value cannot be distinguished by "0" and "1" such as "ON" and "OFF" unlike the above-mentioned case, which may be from 1 to 100 or may be an alphabetical character string (for example, may be an SSID character string or may be an IP address). In this case, for example, a process is executed, in which such a numerical value and an alphabetical character string are added after the above-mentioned "3C" code, so that the numerical value and the character string can be set as a recovery code.

Recovery Execution Process

Figure 4:
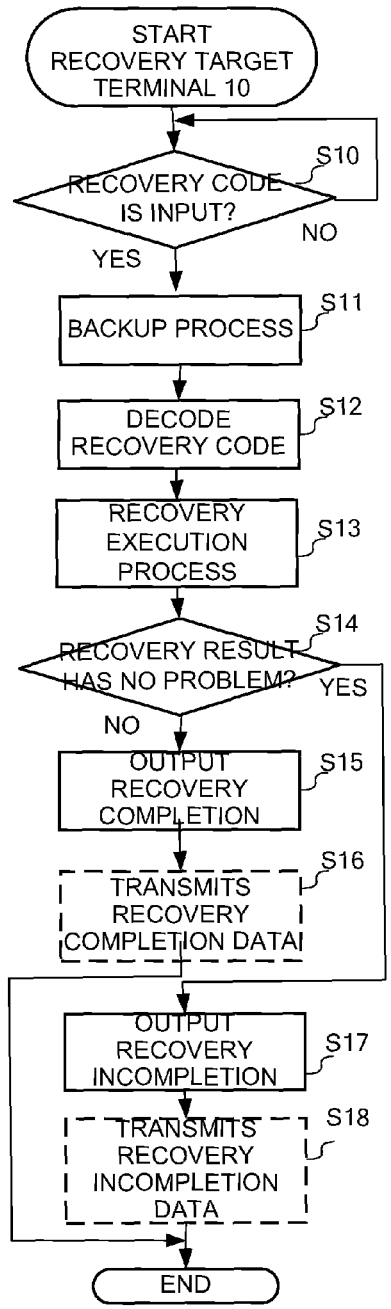
FIG. 4 shows the flow chart illustrating the recovery execution process executed by a recovery target terminal 10.
Figure 11:
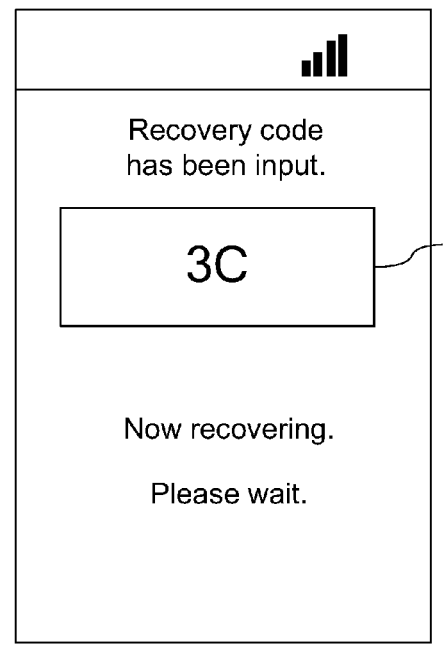
FIG. 11 shows the screen image of the recovery code input screen output to a recovery target terminal 10.

At this point, when the recovery target terminal 10 and the operator terminal 150 are not connected, thereby not enabling data communication with each other, an operator tells a recovery code through phone or the like to a user who operates the recovery target terminal 10. The recovery code input screen shown in FIG. 11 is displayed on the recovery target terminal 10. With reference to FIG. 4, a user inputs the recovery code received from the operator to the recovery code input window 51 (Step S10: "YES"), and the process is thus moved to the step S11. Otherwise, the process waits until a recovery code is input (Step S10: "NO").

Figure 3:
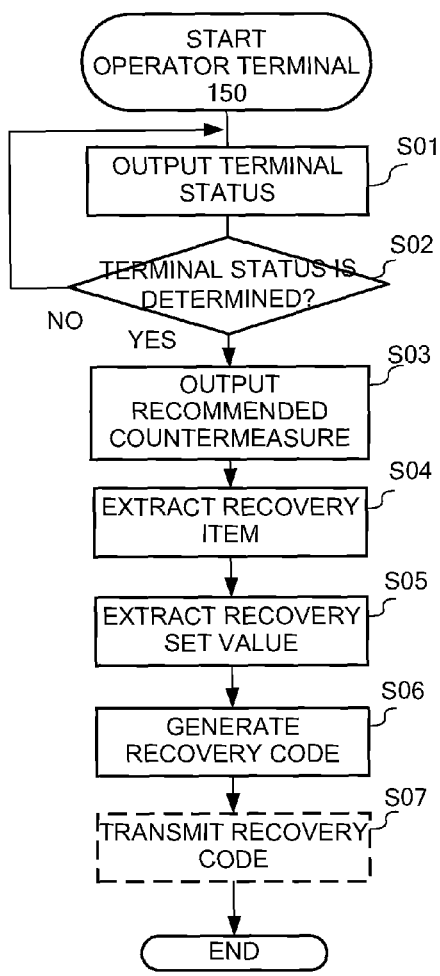
FIG. 3 shows the flow chart illustrating the recovery code generation process executed by an operator terminal 150.

On the other hand, when the recovery target terminal 10 and the operator terminal 150 are connected for enabling data communication with each other, the operator terminal 150 transmits a recovery code to the recovery target terminal 10 (Step S07, also see FIG. 3). With reference to FIG. 4, the recovery target terminal 10 inputs a recovery code based on a recovery code received from the operator terminal 150 without waiting for input from a user (Step S10: "YES"), and moves the process to the step S11. Otherwise, the process waits until a recovery code is input (Step S10: "NO").

Then, the recovery target terminal 10 executes the backup process (Step S11). The backup process is a process to back up the set value before recovery for the case in which the set value for changing a set value with a recovery code. For example, only a set value corresponding to the recovery item shown in a recovery code is backed up. The recovery target terminal 10 can perform rollback using backup data at any time after recovery completion or recovery incompletion is output.

The backup process may be performed immediately after inputting a recovery code like the step S11, or may be performed based on operation conducted by a user and the like before a recovery code is input.

Then, the recovery code decoding module 20 of the recovery target terminal 10 decodes a recovery code to acquire a recovery item and a recovery set value (Step S12). Like the operator terminal 150, the recovery target terminal 10 stores the recovery code correspondence table and the recovery result correspondence table. In the above-mentioned example (the recovery code "00111100"), the recovery set value of the recovery item "Wi-Fi setting" can be decoded as "ON," and the recovery set value of the recovery item "SSID setting" can be decoded as "ON."

Then, the recovery execution module 21 of the recovery target terminal 10 executes the recovery process (Step S13). The recovery execution module 21 refers to the recovery process correspondence table to extract the recovery module, based on the recovering setting item and the recovery set value that have been acquired by decoding. The recovery execution module 21 executes a recovery module to recover the recovery item. In the above-mentioned example, the recovery execution module 21 starts the recovery module A corresponding to the recovery item "Wi-Fi setting," to change the setting of the recovery item "Wi-Fi setting" into "ON".

Then, the recovery execution module 21 examines whether or not the recovery result has a problem (Step S14). Specifically, after the recovery module A is executed, the corresponding check module is executed. The check module is a program to check whether or not a recovery item is set just as a recovery set value.

Figure 12:
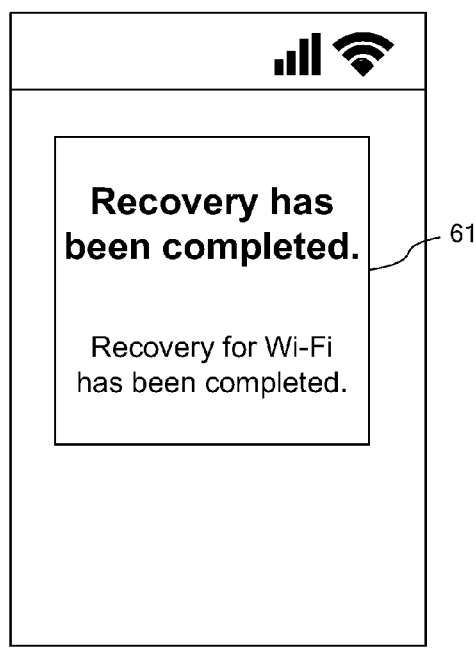
FIG. 12 shows the screen image of recovery completion output screen output to a recovery target terminal 10.

If determining that the recovery result has no problem (Step S14: "NO"), the recovery execution module 21 outputs recovery completion (Step S15). For example, as shown in FIG. 12, recovery completion is output as a result of inputting a recovery code for a user. At this time, the recovery execution module 21 outputs recovery completion when determining that the recovery result has no problem (Step S15).

When the recovery target terminal 10 and the operator terminal 150 are connected for enabling data communication with each other, recovery completion data notifying recovery completion is transmitted to the operator terminal 150 (Step S16). The operator terminal 10 that has received recovery completion data notifies an operator of recovery completion.

On the other hand, if determining that the recovery result has a problem in which the recovery setting value has not been set (Step S14: "YES"), the recovery execution module 21 outputs recovery incompletion (Step S17). Similarly, when the recovery target terminal 10 and the operator terminal 150 are connected for enabling data communication with each other, recovery incompletion data notifying recovery incompletion is transmitted to the operator terminal 150 (Step S18). The operator terminal 10 that has received recovery incompletion data notifies an operator of recovery incompletion.

Case of Recovery Item Varied with Terminal Model

In the above-mentioned example, as shown in the recovery item correspondence table of FIG. 5 a terminal status corresponds to a recovery item for the terminal status one on one. However, in the case of a different model of the recovery target terminal 10, a recovery item may not necessarily correspond to a terminal status one on one.

For example, the terminal status "Communication through Wi-Fi is disabled." can be recovered in the terminal A by setting the recovery set value of the recovery item "Wi-Fi setting" to "ON," but in the terminal B by setting the recovery set value of the recovery item "Network setting" to "ON." Furthermore, in the terminal C by setting the recovery set value of the recovery item "Internet security setting" to "Middle."

Accordingly, even if the purpose to recover a terminal status is the same, the recovery item that is a concrete means for recovering a terminal status may be different due to a different model of the recovery target terminal 10. In this case, the recovery target terminal 10 refers to the terminal model classified recovery item correspondence table instead of the recovery item correspondence table (e.g., see FIG. 13).

An operator must ask a user about the model name of the recovery target terminal 10 through phone in advance or acquires the model name by referring to the registered user ID and the like. The operator input the terminal model name to the operator terminal 150, and then the recovery related data extraction module 160 refers to the terminal model classified recovery item correspondence table to extract a corresponding recovery item and a recovery set value corresponding to this recovery item. The process after this is executed as described above like the process after the step S06 of the recovery code generation process.

Even if an operator do not know a recovery item and a recovery set value for recovering a problem indicated by a terminal status due to a different name of the recovery target terminal 10, the present process extracts the recovery item of each terminal from a terminal status and a model name, resulting in an problem indicated by a terminal status to be solved.

To achieve the means and the functions as described above, a computer (including a CPU, an information processor, and various terminals) reads and executes a predetermined program. For example, a program is provided in forms recorded in a computer-readable record medium such as a flexible disk, a CD (CD-ROM, etc.), and a DVD (DVD-ROM, DVD-RAM, etc.). In this case, a computer reads a program from a record medium, forwards the program to internal or external storage to store the program therein, and executes the program. For example, the program may be preliminarily recorded in a memory device (record media) such as a magnetic disk, an optical disk, and a magnetic optical disk, and then provided from the memory device to a computer through a communication line.

The embodiments of the present invention are described above, but the present invention is not limited to these above-mentioned embodiments. The effects described in the embodiments of the present invention are merely listed as the most suitable effects produced from the present invention. The effect of the present invention is not limited to those described in the embodiments of the present invention.

REFERENCE SIGNS LIST

1 Recovery code generation system
3 Public line network
10 Recovery target terminal
100 Operator server
150 Operator terminal

The invention claimed is:

1. A terminal recovery method of recovering a terminal status by
changing a set value of a recovery target terminal, comprising the steps of:
receiving input of the terminal status of the recovery target terminal from an operator by an operator terminal;
extracting a recovery item for recovering the terminal status of the recovery target terminal and a recovery set value being a value recovered corresponding to the recovery item by an operator terminal based on the input terminal status;
generating a recovery code at least including the recovery item and the recovery set value by an operator terminal;
decoding the recovery code in response to input of the recovery code to acquire the recovery item and the recovery set value by the recovery target terminal; and executing a recovery process to recover the terminal status based on the acquired recovery item and the acquired recovery set value by the recovery target terminal.

2. The terminal recovery method according to claim 1 further comprising the step of acquiring a backup of a corresponding recovery item and a recovery set value corresponding to the recovery item at the time before or after the recovery code is input, by the recovery target terminal.

3. The terminal recovery method according to claim 1 further comprising the step of examining the recovery result of the recovery process.

4. The terminal recovery method according to claim 1, wherein when the purpose to recover the terminal status is the same, but the recovery item that is a concrete means to recover the terminal status is different due to a different model of the recovery target terminal, in the step of extracting the recovery item, a corresponding recovery item and a recovery set value corresponding to the recovery item is extracted by receiving input of a model name corresponding to the model.

5. A terminal recovery system comprising a recovery target terminal and an operator terminal, the system recovering a terminal status by changing a set value of the recovery target terminal, wherein the operator terminal includes an operator terminal processor and operator terminal memory storing instructions which, when carried out by the operator terminal processor, form:
- a terminal status input receiving module receiving input of the terminal status of the recovery target terminal from an operator;
- a recovery related data extraction module extracting a recovery item for recovering the terminal status of the recovery target terminal and a recovery set value being a value recovered corresponding to the recovery item based on the terminal status; and
- a recovery code generation module generating a recovery code at least including the recovery item and the recovery set value, and wherein the recovery target terminal includes a recovery target terminal processor and recovery target terminal memory storing instructions which, when carried out by the recovery target terminal processor, form:
- a recovery code decoding module decoding the recovery code in response to input of the recovery code to acquire the recovery item and the recovery set value; and
- a recovery execution module executing a recovery process to recover the terminal status based on the acquired recovery item and the acquired recovery set value.

6. A computer program product for use in a terminal recovery system including a recovery target terminal and an operator terminal, the system recovering a terminal status by changing a set value of the recovery target terminal, comprising; a non-transitory computer usable medium having a set of instructions physically embodied therein; the set of instructions including:
- computer readable program code causing the operator terminal to receive input of the terminal status of the recovery target terminal from an operator;
- computer readable program code causing the operator terminal to extract a recovery item for recovering the terminal status of the recovery target terminal and a recovery set value being a value recovered corresponding to the recovery item based on the terminal status;
- computer readable program code causing the operator terminal to generate a recovery code at least including the recovery item and the recovery set value;
- computer readable program code causing the recovery target terminal to decode the recovery code in response to input of the recovery code to acquire the recovery item and the recovery set value; and
- computer readable program code causing the recovery target terminal to execute a recovery process to recover the terminal status based on the acquired recovery item and the acquired recovery set value.

* * * * *